US009176714B2

(12) United States Patent
Majoros (10) Patent No.: US 9,176,714 B2
(45) Date of Patent: Nov. 3, 2015

(54) RE-USING LEGACY LIBRARIES IN SOFTWARE (75) Inventor: Christopher P. Majoros, Bedford, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2487 days.

(21) Appl. No.: 11/938,336

(22) Filed: Nov. 12, 2007

(65) Prior Publication Data
US 2009/0125895 A1 May 14, 2009

(51) Int. Cl.
G06F 9/44 (2006.01)
G06F 9/45 (2006.01)

(52) U.S. Cl.
CPC .. *G06F 8/36* (2013.01); *G06F 8/30* (2013.01); *G06F 8/433* (2013.01); *G06F 8/51* (2013.01)

(58) Field of Classification Search
CPC .............. G06F 8/30; G06F 8/51; G06F 8/52; G06F 8/433; G06F 1/261; G06F 9/45504; G06F 9/44521; G06F 11/3664
See application file for complete search history.

(56) References Cited

U.S. PATENT DOCUMENTS

| 6,826,387 | B1* | 11/2004 | Kammer | 455/41.2 |
| 7,647,347 | B2* | 1/2010 | Stokes | 345/604 |
| 7,647,348 | B2* | 1/2010 | Stokes | 345/604 |
| 7,941,543 | B2* | 5/2011 | Moussallam et al. | 709/227 |
| 2002/0046294 | A1* | 4/2002 | Brodsky et al. | 709/246 |
| 2002/0078010 | A1* | 6/2002 | Ehrman et al. | 707/1 |
| 2002/0147962 | A1* | 10/2002 | Hatanaka | 717/102 |
| 2003/0055921 | A1* | 3/2003 | Kulkarni et al. | 709/220 |
| 2003/0149966 | A1* | 8/2003 | McGuire | 717/148 |
| 2004/0015972 | A1* | 1/2004 | Barclay | 718/102 |
| 2004/0024610 | A1* | 2/2004 | Fradkov et al. | 705/1 |
| 2004/0111464 | A1* | 6/2004 | Ho et al. | 709/203 |
| 2004/0205583 | A1* | 10/2004 | Jones et al. | 715/513 |
| 2004/0205738 | A1* | 10/2004 | Yoshida et al. | 717/150 |
| 2005/0099427 | A1* | 5/2005 | Stokes | 345/589 |
| 2005/0138603 | A1* | 6/2005 | Cha et al. | 717/120 |
| 2005/0240621 | A1* | 10/2005 | Robertson et al. | 707/102 |
| 2005/0251796 | A1* | 11/2005 | Poelman et al. | 717/163 |
| 2006/0064178 | A1* | 3/2006 | Butterfield et al. | 700/18 |
| 2006/0119611 | A1* | 6/2006 | Stokes | 345/589 |
| 2006/0225033 | A1* | 10/2006 | Ye et al. | 717/106 |
| 2007/0011126 | A1* | 1/2007 | Conner et al. | 706/47 |

(Continued)

OTHER PUBLICATIONS

Canfora et al., "Decomposing legacy programs", 2000 Elsevier Science Inc., pp. 99-110; <http://www.sciencedirect.com/science/article/pii/S0164121200000303>.*

(Continued)

Primary Examiner — Thuy Dao
Assistant Examiner — Ben C Wang
(74) Attorney, Agent, or Firm — Cuenot, Forsythe & Kim, LLC (57) ABSTRACT A method of using a computer program that accesses legacy program code can include distinguishing between non-legacy program code of the computer program and legacy program code of the computer program, separating the computer program into at least a first logical unit including non-legacy program code and at least a second logical unit including legacy program code, and including interface code within the first logical unit. The interface code can be non-legacy program code that communicates with the second logical unit. The first logical unit and the second logical unit can be output.

20 Claims, 5 Drawing Sheets

(56) References Cited

U.S. PATENT DOCUMENTS

| | | | |
|---|---|---|---|
| 2007/0039010 A1* | 2/2007 | Gadre | 719/328 |
| 2007/0198562 A1* | 8/2007 | Kulkarni et al. | 707/101 |
| 2007/0226714 A1* | 9/2007 | Doi | 717/148 |
| 2007/0260633 A1* | 11/2007 | Rapicault et al. | 707/103 R |
| 2008/0052685 A1* | 2/2008 | Jeong et al. | 717/136 |
| 2008/0115119 A1* | 5/2008 | Lagergren | 717/148 |
| 2008/0134154 A1* | 6/2008 | Patel et al. | 717/139 |
| 2008/0301653 A1* | 12/2008 | Song et al. | 717/148 |
| 2009/0037896 A1* | 2/2009 | Grechanik et al. | 717/168 |
| 2010/0306759 A1* | 12/2010 | Kohler et al. | 717/174 |
| 2011/0276955 A1* | 11/2011 | Kanokogi | 717/166 |
| 2012/0266147 A1* | 10/2012 | Dawson et al. | 717/148 |
| 2014/0068579 A1* | 3/2014 | Dawson et al. | 717/148 |
| 2014/0189662 A1* | 7/2014 | Mameri et al. | 717/140 |

OTHER PUBLICATIONS

Harry M. Sneed, "Encapsulation of legacy software", 2000 J. C. Baltzer AG, Science Publishers pp. 293-313; <http://reversingprojectinfo/project_repository/reversing_references/pdf/encapsulation_of_legacy_software.pdf>.*

Seacord et al., (Legacy System Modernization Strategies, Technical Report CMU/SEI-2001-TR-025 ESC-TR-2001-025, Jul. 2001, Carnegie Mello Software Engineering Institute, Pittsburgh, PA; <https://resources.sei.cmu.edu/asset_files/TechnicalReport/2001_005_001_13895.pdf>.*

Maeng et al., "An RTOS API Translator for Model-driven Embedded Software Development", IEEE, RTCSA'06, Aug. 2006, pp. 1-5; <http://ieeexplore.ieee.org/stamp/stamp.jsp?tp=&arnumber=1691335>.*

Thiran et al., "Wrapper-Based Evolution of Legacy Information Systems", ACM, Oct. 2006, pp. 329-359; <http://dl.acm.org/results.cfm?h=1&cfid=678840066&cftoken=57943484>.*

Haddad et al., "Wrapper-Based Framework for Domain-Specific Software Reuse", Journal of Information Science and Engineering 22, 269-282, Mar. 3, 2006, pp. 269-282; <www.iis.sinica.edu.tw/page/jise/2006/200603_03.pdf>.*

* cited by examiner

```
┌─────────────────────────────┐
│ Execute first logical unit in first │
│           process            │
│                          405 │
└─────────────────────────────┘
              ↓
┌─────────────────────────────┐
│  First logical unit initiates      │
│ execution of second logical unit in│
│        second process        │
│                          410 │
└─────────────────────────────┘
              ↓
┌─────────────────────────────┐
│  Second logical unit begins      │
│ executing in second process with │
│           emulator           │
│                          415 │
└─────────────────────────────┘
              ↓
┌─────────────────────────────┐
│  First logical unit initiates request │
│       of second logical unit       │
│                          420 │
└─────────────────────────────┘
              ↓
┌─────────────────────────────┐
│  Second logical unit services    │
│  request, outputs response, and  │
│       terminates execution       │
│                          425 │
└─────────────────────────────┘
              ↓
      ◇ Response from
     second logical unit found and      ── No ──→  ┌──────────────────────┐
     second logical unit no longer                  │ Generate error message │
           executing?                               │                    435 │
              430                                   └──────────────────────┘
              ↓ Yes
┌─────────────────────────────┐
│ Continue execution of first logical │
│              unit            │
│                          440 │
└─────────────────────────────┘
```

RE-USING LEGACY LIBRARIES IN SOFTWARE

FIELD OF THE INVENTION

The embodiments disclosed herein relate to computer systems and, more particularly, to re-using legacy computer program code.

BACKGROUND OF THE INVENTION

Computer technology has progressed, and continues to do so, at a rapid pace. The time period measured from the introduction into the marketplace of one generation of a computing platform to the availability of the next generation continues to shrink. Inevitably, the underlying technologies incorporated into each successive generation of computing platform evolve, making some technologies obsolete or unusable within newer systems.

Consider the case where a computing platform transitions from one type of processor, e.g., microprocessor, to another. In some cases, such a transition will be entirely backward compatible with existing, or legacy, technologies. In other cases, however, the transition will mean that legacy technologies may no longer function or at least require some technological "work-around" to continue operating within the newer computing platform.

When a computing platform transitions to different technology, e.g., in the case of switching from one microprocessor to another, much of the software for the original computing platform may need to be rewritten, or at least re-compiled, for use on the next generation computing platform. As is known, each microprocessor executes or understands an instruction set that is specific to that processor. The instruction set for one processor is likely entirely foreign to the other. In such cases, legacy computer programs may not execute or function properly on the next generation computing platform.

Often, a computer program incorporates different software libraries that are developed and/or made available by third parties. Third party developers may choose not to undertake the work necessary to make the software library compatible with the next generation computing platform. This means that any software developer that makes a product that relies upon a legacy software library, in general, is faced with the choice of having to drop the features enabled by the legacy software library from the product, develop a version of the software library from scratch that is compatible with the new computing platform, or discontinue the product altogether.

BRIEF SUMMARY OF THE INVENTION

The embodiments disclosed herein relate to processing a computer program that includes both legacy program code and non-legacy program code to execute within a computing platform. One embodiment of the present invention can include a method of using a computer program that accesses legacy program code. The method can include distinguishing between non-legacy program code of the computer program and legacy program code of the computer program, separating the computer program into at least a first logical unit including non-legacy program code and at least a second logical unit including legacy program code, and including interface code within the first logical unit. The interface code can be non-legacy program code that communicates with the second logical unit. The first logical unit and the second logical unit can be output.

Another embodiment of the present invention can include a method of using a computer program that utilizes legacy program code. The method can include separating the computer program into at least a first logical unit including non-legacy program code and at least a second logical unit including legacy program code. The first logical unit can be executed within a first process of a computing platform and initiate execution of the second logical unit. The second logical unit can be executed within a second process of the computing platform in cooperation with an emulator. The second logical unit can service a request from the first logical unit. A response to the request can be output from the second logical unit.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart(s) and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart(s) and/or block diagram block or blocks.

The embodiments disclosed herein relate to re-using legacy computer program code (program code). In accordance with the inventive arrangements disclosed herein, a computer program that includes both legacy program code and non-legacy program code can continue to be used within a computing platform. In general, the legacy and non-legacy program code can be organized into one or more modules that include only non-legacy program code and one or more modules that include only legacy program code. The modules can be augmented with further program code that facilitates communication among the modules.

Each module can be processed so that when executed, the module including legacy program code executes within one process of a selected computing platform, while the module that includes non-legacy program code executes within a different process of the selected computing platform. In effect, the computer program can be processed so that the module of legacy program code functions as one application and the module of non-legacy program code functions as a separate, independent application. The separation, however, can be hidden from the end user. From the viewpoint of the end user, a single application appears to be executing with the functionality of both the legacy and non-legacy program code.

Figure 1:
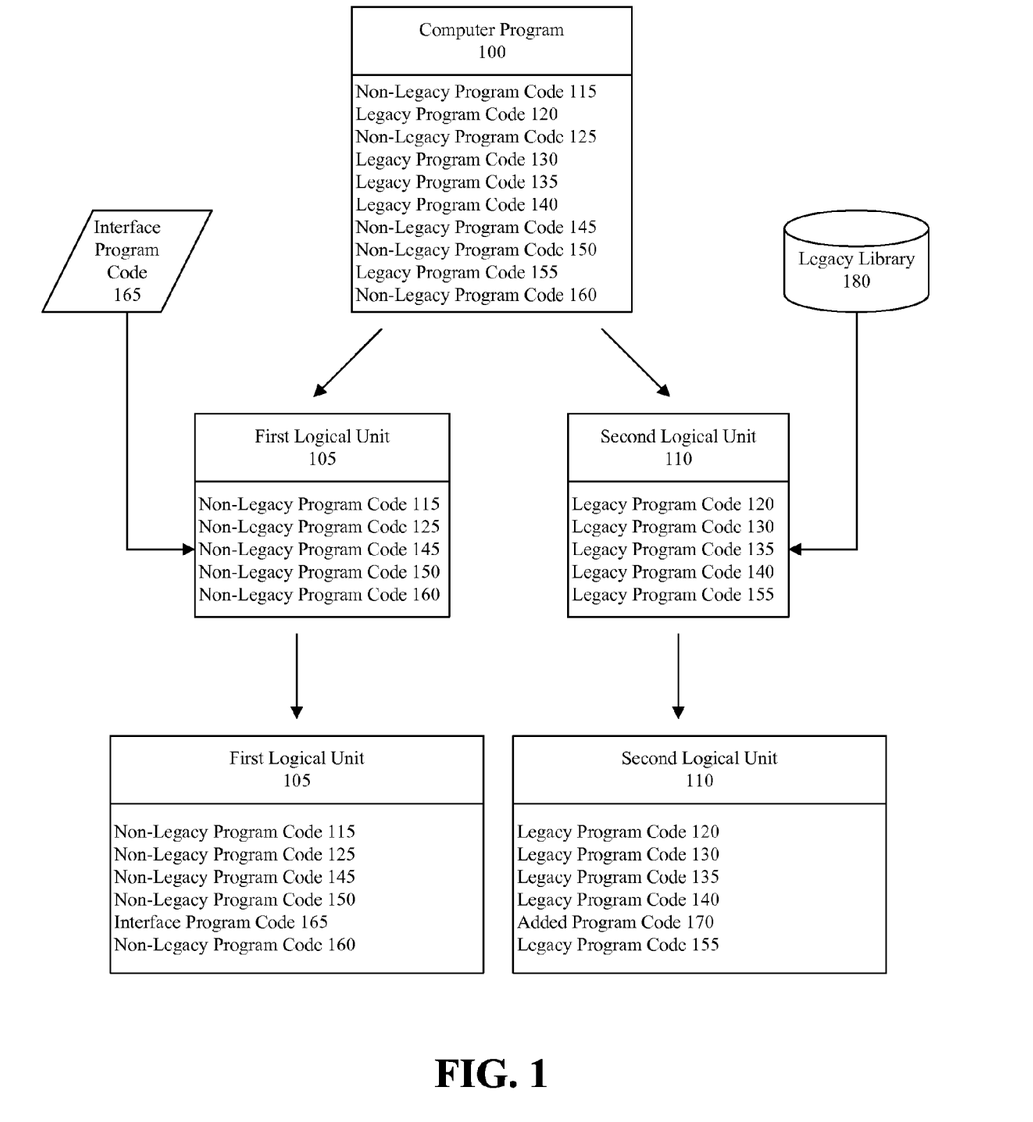
FIG. 1 is a block diagram illustrating a technique for using a computer program having legacy program code in accordance with one embodiment of the present invention.

FIG. 1 is a block diagram illustrating a technique for using a computer program having legacy program code in accordance with one embodiment of the present invention. As shown, a computer program 100 can include multiple portions of program code. The computer program 100 can include non-legacy program code 115, 125, 145, 150, and 160 as well as legacy program code 120, 130, 135, 140, and 155.

The phrases "legacy program code" and "non-legacy program code," as used herein, can refer to portions of program code from the viewpoint of a selected computing platform. That is, program code may be either legacy program code or non-legacy program code with respect to the selected computing platform. The phrase "computing platform," as used herein, can refer to a computer system and specify information such as, for example, the hardware of the computer system, e.g., the processor or microprocessor, the operational software, e.g., the operating system, of the computer system, or aspects of both hardware and operational software.

More particularly, the phrase "legacy program code" can refer to program code that does not execute natively on the selected computing platform. Legacy program code may include not only program code that does not execute natively, but also program code that accesses or calls legacy program code, e.g., program code that loads, interfaces, and/or terminates a legacy library of program code. As a computing platform transitions from one technology to another, computer programs may cease to function or execute on the newer generation of computing platform. The technology shift of the computing platform may involve changes to the underlying hardware, changes to the operational software of the computing platform, or changes to both operational software and hardware.

As legacy program code will not execute natively within the computing platform, some type of emulation is needed. A "software emulator" or "emulator," as used herein, can refer to a computer program that facilitates operation of a legacy computing program on a non-legacy computing platform. The emulator allows the legacy computer program to execute on a computing platform upon which the legacy computer program would not otherwise be supported, e.g., a "foreign" computing platform. The emulator can interpret or translate the legacy computer program into a non-legacy format that may be understood or used by the foreign computing platform. Thus, rather than running natively, e.g., without the need for an emulator, the legacy program code can execute with the aid of the emulator.

One example of an emulation technology is Rosetta, from Apple Inc. of Cupertino, Calif. Rosetta refers to a translation process that runs on a binary for PowerPC type microprocessors on Intel-based Macintosh type computers. PowerPC type microprocessors are available from International Business Machines Corporation of Armonk, N.Y. (IBM). IBM and PowerPC are trademarks of International Business Machines Corporation in the United States, other countries, or both.

Applications running with Rosetta run as non-native binaries within the computing platform. When an application launches on an Intel-based Macintosh computer, the operational software can detect whether the application is a native binary. If the binary is not native, the kernel of the operational software launches the binary using Rosetta. Rosetta translates and executes the PowerPC binary, e.g., legacy computer program. Rosetta runs in the same thread of control as the application.

While Rosetta facilitates execution of legacy computer programs, Rosetta does not support computer programs that comprise both legacy and non-legacy portions of program code. A computer program must be entirely coded using legacy program code in order to work with Rosetta emulation technology. Further information about Rosetta technology can be found in "Universal Binary Programming Guidelines, Second Edition" from Apple Inc., which is fully incorporated herein by reference.

Continuing with FIG. 1, computer program 100 can be processed so that legacy program code is distinguished and separated from non-legacy program code. This can be performed at the source code level. It should be appreciated, however, that in some cases third party developers provide libraries that have been compiled for legacy computing platforms. Accordingly, the libraries may only be available as legacy code and may already be compiled, e.g., not available as source code. In any case, the legacy code still may be separated from non-legacy code by separating and/or arranging function calls, objects, methods, and other software constructs and/or structures of the computer program 100.

As shown, non-legacy program code 115, 125, 145, 150, and 160 can be separated into a first logical unit 105. Legacy program code 120, 130, 135, 140, and 155 can be separated into a second logical unit 110. Each logical unit can include either non-legacy program code or legacy program code, but not both. As shown, the legacy program code portions within the second logical unit 110 may access or rely upon the legacy library 180, which includes legacy program code.

To separate the legacy program code from non-legacy program code, any legacy program code and any program code that communicates with the legacy program code can be placed into the second logical unit 110. For example, in the event that the computer program 100 relies upon the legacy library 180, the legacy library 180 and any code that accesses the legacy library 180 may be separated into the second logical unit 110. It should be appreciated that any program code that accesses the legacy library 180 that is located in the second logical unit 110 also may be implemented as legacy program code.

The first logical unit 105 can be compiled for native execution for the selected computing platform, e.g., the next generation computing platform. The second logical unit 110 can be compiled for native execution on the legacy computing platform. In consequence, the second logical unit will require an emulator for execution on the selected computing platform. Each resulting logical unit can be executed within a different and independent process of the operational software of the selected computing platform. In effect, each logical unit behaves as a separate application program on the computing platform.

In addition to separating legacy program code from non-legacy program code, the first logical unit can be updated to include interface program code 165. The interface program code 165 can be incorporated prior to compilation. The interface program code 165 can be non-legacy program code that is configured to communicate with the second logical unit 110. For example, the interface program code 165 can initiate execution of the second logical unit, issue requests to the second logical unit 110, as well as receive information, e.g., a response, back from the second logical unit 110. Further, the interface program code 165 can determine whether the second logical unit 110 is executing or has terminated execution.

The second logical unit 110 can be updated to include added program code 170. The added program code 170, which is coded in legacy program code, can perform functions such as outputting the response from the second logical unit 110 to the first logical unit 105, or simply writing to a file or location that can be accessed by the first logical unit 105. As used herein, "output" or "outputting" can include, but is not limited to, writing to a file, writing to a user display or other output device, playing audible notifications, sending or transmitting to another system, exporting, or the like. The added program code 170 further can terminate execution of the second logical unit 110, e.g., terminate the independent process within which the second logical unit 110 is executing.

It should be appreciated that while only two logical units are shown, the computer program 100 may be separated into more than two logical units. For example, more than one logical unit may be used to organize legacy program code. Each such logical unit may be executed within an independent process.

Figure 2:
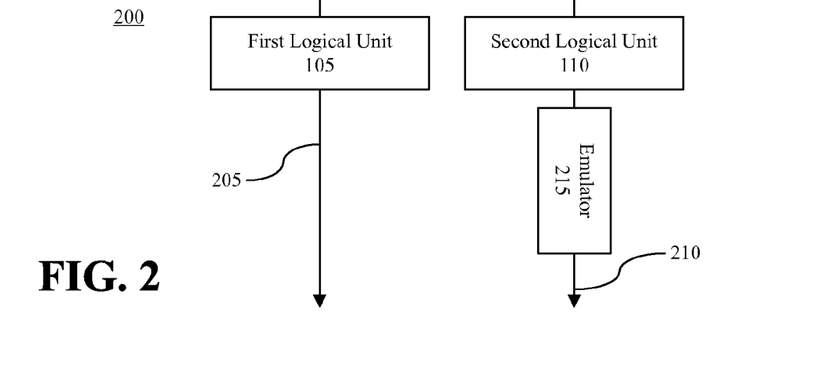
FIG. 2 is a second block diagram illustrating a technique for using a computer program having legacy program code in accordance with another embodiment of the present invention.

FIG. 2 is a second block diagram illustrating a technique for using a computer program having legacy program code in accordance with another embodiment of the present invention. FIG. 2 illustrates a computing platform 200 in which the computer program 100 may be executed after processing as described with reference to FIG. 1. The first logical unit 105 may be compiled to execute natively on computing platform 200. The second logical unit 110 may be compiled, or have been compiled, to execute on a different computing platform, e.g., the legacy or foreign computing platform.

Accordingly, the first logical unit 105 can execute within a first process 205 of the operational software of computing platform 200. The second logical unit 110 can execute within a second process 210 of the operational software of computing platform 200. As shown, the second logical unit 110 can execute in conjunction with an emulator 215. The second logical unit 110, for example, may be translated into a native format by the emulator 215 for execution on computing platform 200.

In one embodiment, the computing platform may be a Macintosh computer having an Intel-type microprocessor as is commercially available from Apple Inc. The microprocessor may be, for example, an Intel Core 2 Duo or other processor available from Intel Corporation of Santa Clara, Calif. The second logical unit 110 may include legacy program code, e.g., program code intended to execute on a Macintosh computer system having a PowerPC type processor. By separating the legacy program code from the non-legacy program code and running each within an independent process, an emulation technology such as Rosetta may be used.

The second logical unit 110 includes only legacy program code and executes within an independent process, as an independent application. The interface program code described with reference to FIG. 1 may generally handle exchange of information between the two logical units. As noted, the second logical unit 110 can be augmented with added program code that outputs a result and terminates execution of the second logical unit 110 and/or terminates the second process 210.

In illustration, consider the case in which a computer program once coded in legacy program code has been ported over as a non-legacy computer program. That computer program, however, may rely upon a library of functions available from a third part developer that continues to be available only as legacy program code. Incorporating such a legacy library into the ported computer program is not workable as an emulator such as Rosetta will only operate upon a purely legacy computer program.

By arranging the computer program into different logical units, the emulation technology may be used. This can lead to increased performance in that much of the computer program will have been ported to non-legacy program code that executes natively and, thus, more quickly than non-native program code requiring emulation. Only the legacy program code need run with the aid of the emulator 215. This can lead to faster program execution as the entire computer program need not be emulated.

Figure 3:
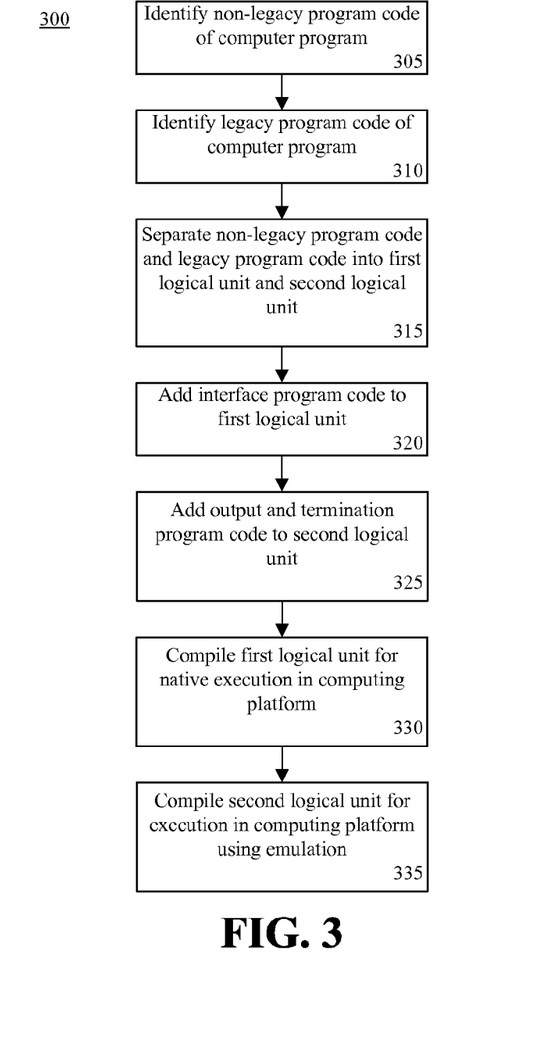
FIG. 3 is a flow chart illustrating a method of using a computer program having legacy program code in accordance with another embodiment of the present invention.

FIG. 3 is a flow chart illustrating a method 300 of using a computer program having legacy program code in accordance with another embodiment of the present invention. Method 300 can be implemented using a software development tool, e.g., an integrated development environment, or the like. Method 300 can begin in a state in which a computer program that includes both legacy program code and non-legacy program code has been loaded or otherwise identified by the tool.

In step 305, non-legacy program code of the computer program can be identified. In step 310, legacy program code of the computer program can be identified. In this manner, legacy program code can be distinguished from non-legacy program code. In step 315, non-legacy program code can be separated from legacy program code. Non-legacy program code can be placed into a first logical unit. Legacy program code can be placed into a second logical unit. As noted, legacy program code and any program code that interfaces with the legacy program code can be placed into the second logical unit. Accordingly, the code that accesses the legacy program code, e.g., a third party software library, must also be legacy program code. In separating the legacy and non-legacy program code, the various portions of program code may be re-ordered or reorganized as will be described herein in greater detail and by way of example.

In step 320, interface program code can be added to the first logical unit. In step 325, program code that outputs the result of the second logical unit and program code that terminates execution of the second logical unit and the second process can be added to the second logical unit. In step 330, the first logical unit can be compiled for native execution on the selected computing platform. In step 335, the second logical unit can be compiled for native execution on a legacy computing platform. Accordingly, the second logical unit will require emulation on the selected computing platform.

Method 300 can be adjusted to provide an output after one or more of the steps described. For example, the first and second logical units can be output after step 315. The logical units may be output after inclusion of the interface program code in step 320 and/or after step 325. One or both of the compiled logical units may be output after step 330 and/or 335.

Figure 4:
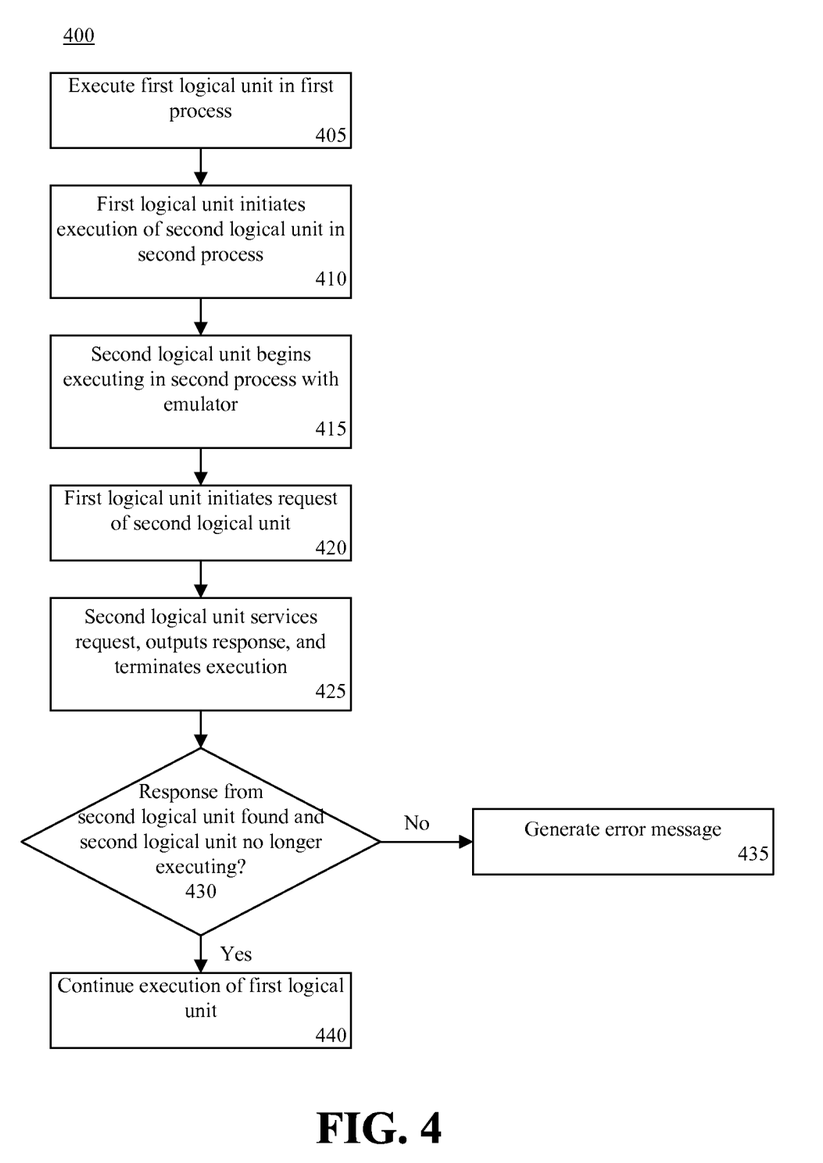
FIG. 4 is a second flow chart illustrating a method of using a computer program having legacy program code in accordance with another embodiment of the present invention.

FIG. 4 is a second flow chart illustrating a method of using a computer program with legacy program code in accordance with another embodiment of the present invention. Method 400 can begin in a state in which a computer program has been processed as described herein in terms of separation of legacy program code from non-legacy program code. The resulting computer program, e.g., logical units, can be executed on a computing platform where the first logical unit executes natively and the second logical unit executes with the aid of an emulator.

Accordingly, in step 405, the first logical unit can be executed within a first process. At some point during execution, at step 410, when the functionality offered by the second logical unit is needed, the first logical unit can initiate execution of the second logical unit. The interface program code inserted into the first logical unit, for example, may initiate execution of the second logical unit within a second process of the operational software of the computing platform.

In step 415, the second logical unit can begin executing in the second process. The operational software of the computing platform can recognize the second logical unit as non-native program code, e.g., a non-native binary, and use or launch an emulator in conjunction with the second logical unit. The emulator can perform translation operations to enable the second logical unit to execute on the selected computing platform.

Execution of the second logical unit can be hidden from the view of an end user. From the viewpoint of the end user, the first logical unit can appear to execute as the computer program. The functionality provided by the second logical unit can appear to come from the computer program, for example, from the first logical unit. As such, the end user is unaware that the entire functionality offered by the legacy program code has been separated out into one or more different computer programs executing within independent processes.

In step 420, the first logical unit can initiate a request for the second logical unit. The request can specify a need for processing provided by the second logical unit, e.g., issue a request to invoke some function from the library of legacy program code. In step 425, the second logical unit can service the request. The second logical unit may output a result or response to the request. For example, the second logical unit may create a file or store data at a location in memory that can be accessed by, or passed to, the first logical unit. After servicing the request from the first logical unit and outputting the result, the second logical unit can cease or terminate execution.

In step 430, the first logical unit can check or determine whether the second logical unit has output a result as well as whether the second logical unit has terminated execution, e.g., is still executing. If a result is available, e.g., has been output, and the second logical unit is no longer terminating, the method can proceed to step 440. If no output result is available, the second logical unit is still executing, or no output is available and the second logical unit continues to execute, the method can proceed to step 435, where an error message can be generated. In step 440, where the output from the second logical unit is available and the second logical unit is no longer executing, the first logical unit can continue execution.

It should be appreciated method 500 can repeat as may be required, for example, to work in conjunction with other legacy program code that may have been located within another logical unit or to continue to call the second logical unit as may be required.

Figure 5:
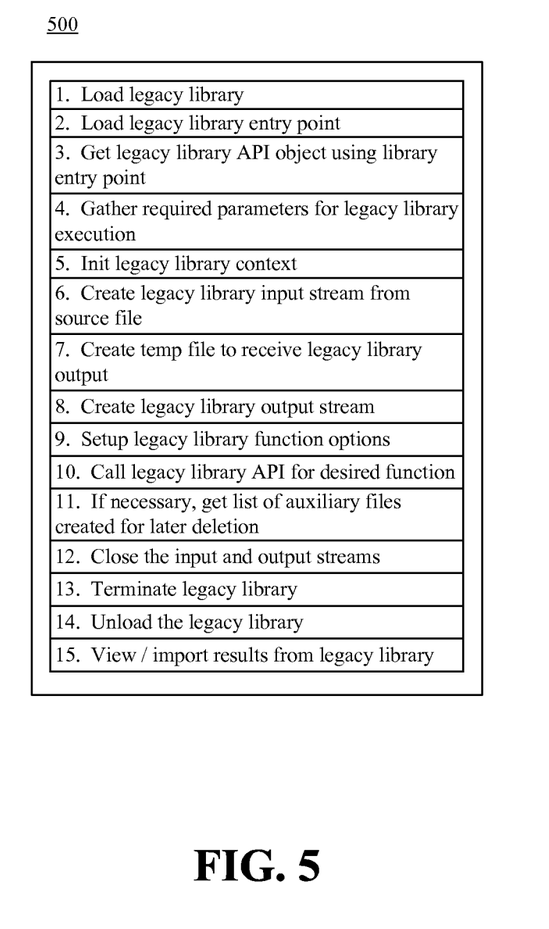
FIG. 5 is a third block diagram illustrating diagram illustrating a technique for using a computer program having legacy program code in accordance with another embodiment of the present invention.

FIG. 5 is a third block diagram illustrating a technique for using a computer program having legacy program code in accordance with another embodiment of the present invention. FIG. 5 illustrates pseudo code for a computer program 500. For purposes of illustration, Lotus Notes (Notes), as is commercially available from IBM, has been used as an exemplary computer program. The computer program 500 can be coded entirely with legacy program code. Accordingly, the computer program 500 would execute natively within a single process on a legacy computing platform. Lotus and Lotus Notes are trademarks of International Business Machines Corporation in the United States, other countries, or both.

Figure 6:
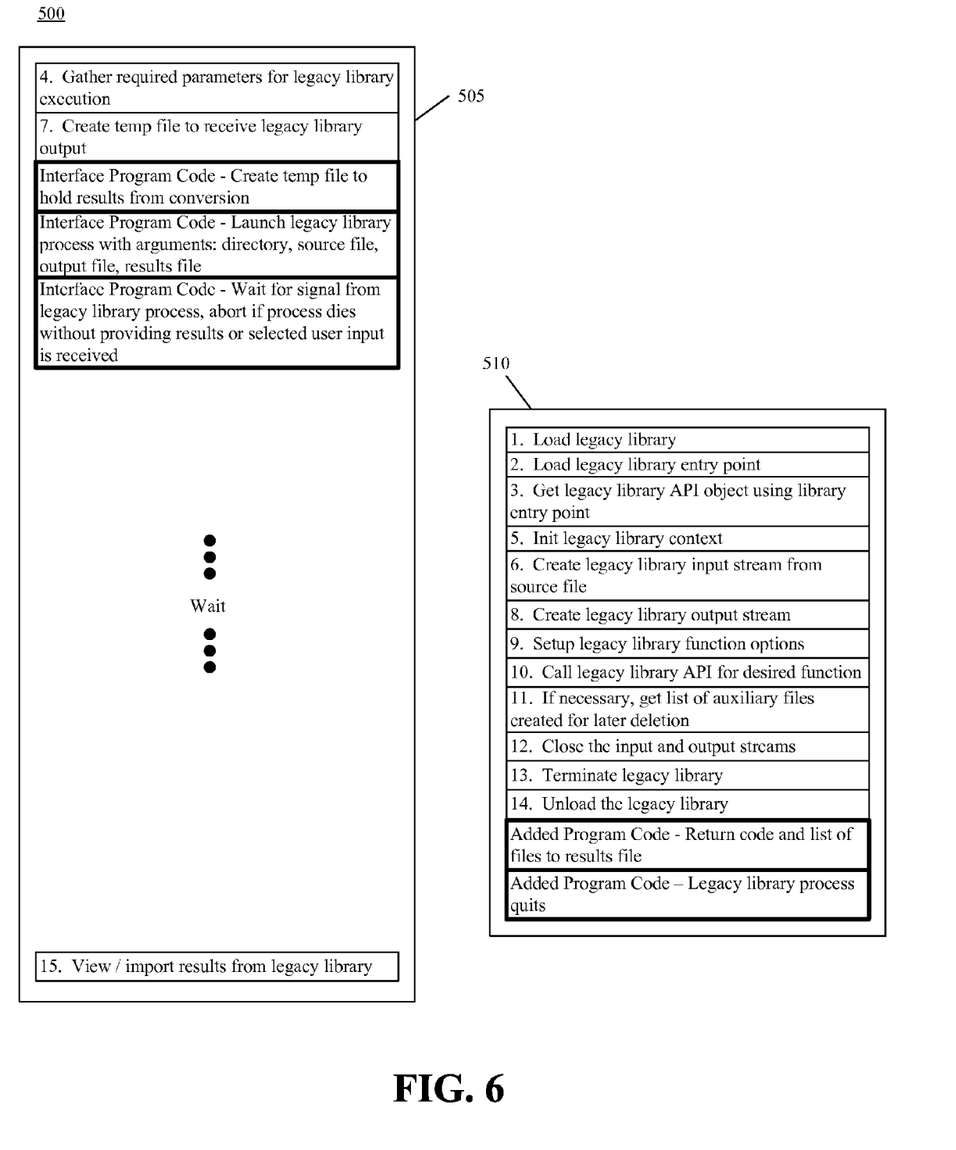
FIG. 6 is a fourth block diagram illustrating a technique for using a computer program having legacy program code in accordance with another embodiment of the present invention.

FIG. 6 is a fourth block diagram illustrating a technique for using a computer program having legacy program code in accordance with another embodiment of the present invention. FIG. 6 illustrates pseudo code for the computer program 500 after application of the techniques described herein. As shown, the computer program 500 has been split into a first logical unit 505 and a second logical unit 510. Like numbers have been used to indicate the reorganization of program code, e.g., blocks of pseudo code, from FIG. 5 to FIG. 6. Logical unit 505 can be coded in non-legacy program code. That is, the functions corresponding to like numbered blocks from FIG. 5 can be ported over for use on a newer computing platform within logical unit 505, e.g., to execute natively.

Logical unit 510 can include legacy program code, e.g., legacy library functions and any program code needed to access that legacy library. The program code corresponding to like numbered blocks from FIG. 5 can remain as legacy program code within logical unit 510. As shown, the program code has been reordered as necessary in order to separate the legacy program code from the non-legacy program code and to ensure that any information collection, other bookkeeping, and/or access to libraries, functions and/or data of the first logical unit that may be needed to invoke the legacy program code is complete prior to execution of the second logical unit. Bolded portions of the pseudo code illustrate the addition of interface program code to logical unit 505 and added code to logical unit 510. As noted, the added code for logical unit 510 can include program code that outputs a response, e.g., creates a file, writes to a file, etc., that may be passed back to logical unit 505 as well as termination program code that terminates execution of logical unit 510 and/or the second process.

As noted, each of logical units 505 and 510 can execute within a different process. As logical unit 510 includes only legacy program code, an emulator can be used to facilitate execution of logical unit 510. Logical unit 505 can begin execution, invoke logical unit 510, await an indication that execution of logical unit 510 has completed successfully, and then continue execution.

Accordingly, a computer program such as Lotus Notes may be ported over to a new computing platform as non-legacy program code and continue to access legacy program code software libraries. With respect to a Macintosh computing platform utilizing an Intel microprocessor, for example, software libraries compiled for PowerPC microprocessors may continue to be used with the aid of an emulator such as Rosetta.

In one embodiment, the legacy logical unit can be implemented as a Mach-O PowerPC binary, which is an executable format for object code used with operating systems such as Mac OS X, which is available from Apple Inc. on Macintosh-type computers, also available from Apple Inc. If necessary, the legacy logical unit can implement a Mach-O-Code Fragment Manager (CFM) bridge to load a Preferred Executable Format (PEF) code fragment. A Mach-O function that takes a callback function pointer as a parameter can be called using documented techniques.

The partitioning of functions described herein may also be applied to the case where development efforts continue with the legacy version of the computer program. In that case, both logical units will be coded and/or compiled for execution on the legacy computing platform. The two logical units will execute in different processes on the legacy computing platform. The two logical units will still appear to function as a single, computer program to an end user. This allows parallel development of an entirely legacy version of the computer program along with a version that includes both legacy and non-legacy program code as described herein. The structure of the entirely legacy computer program and the computer program including both legacy and non-legacy program code will be similar, e.g., parallel.

Taking the prior example of a Macintosh computing platform having a PowerPC microprocessor, the legacy computer program may be segmented into two logical units, one having code that can, or may be, ported to the newer computing platform (Macintosh having an Intel microprocessor) and the other logical unit including program code for a legacy software library and any supporting legacy program code. Both logical units will execute natively on the legacy computing platform, but in different processes. Development efforts can continue with respect to most of the computer program while separating and keeping in tact portions that access legacy software libraries.

Despite the particular computing platform upon which the embodiments disclosed herein are utilized, the logical unit including legacy program code can be implemented with as little overhead as is necessary. This can result in faster execution with the emulator, which is typically slower than executing native program code. The legacy logical unit should not link to any libraries of the non-legacy logical unit.

The embodiments disclosed herein have been provided for purposes of illustration only. Reference to specific types of computer systems, operating systems, processors, or the like has been made to provide a fuller understanding of the embodiments of the present invention. Those skilled in the art will recognize that the embodiments may be applied to other computer systems utilizing different types of processors, hardware, and/or operational software. Accordingly, the embodiments disclosed herein are not to be construed as being limited by the examples provided.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of using a computer program that accesses legacy program code comprising:
    distinguishing between non-legacy program code of the computer program and legacy program code of the computer program;
    separating the computer program into at least a first logical unit comprising non-legacy program code and at least a second logical unit comprising legacy program code;
    including interface code within the first logical unit, wherein the interface code is non-legacy program code that communicates with the second logical unit; and
    outputting the first logical unit and the second logical unit.

2. The method of claim 1, further comprising processing the first logical unit and the second logical to execute in different processes within a computing platform.

3. The method of claim 1, wherein
a computing platform executing the computer program is a non-legacy computing platform, wherein
the method further comprises:
    compiling the first logical unit to execute natively within the computing platform; and
    compiling the second logical unit to execute as non-native program code within the computing platform in cooperation with an emulator.

4. The method of claim 1, wherein
a computing platform executing the computer program is a legacy computing platform, wherein
the method further comprises compiling the first logical unit and the second logical unit to execute natively within the computing platform.

5. The method of claim 1, further comprising
including within the second logical unit legacy program code that outputs a result of the second logical unit and terminates execution of the second logical unit.

6. The method of claim 1, wherein
the including the non-legacy interface code comprises
    adding program code within the first logical unit that
        initiates execution of the second logical unit,
        issues a request to the second logical unit, and
        determines whether the second logical unit is executing.

7. The method of claim 1, further comprising
selecting the legacy program code to execute natively with a first type of processor and
selecting the non-legacy program code to execute natively with a second type of processor.

8. A method of using a computer program that utilizes legacy program code comprising:
    separating the computer program into at least a first logical unit comprising non-legacy program code and at least a second logical unit comprising legacy program code;
    executing the first logical unit within a first process of a computing platform, wherein the first logical unit initiates execution of the second logical unit;
    executing the second logical unit within a second process of the computing platform in cooperation with an emulator, wherein the second logical unit services a request from the first logical unit; and
    outputting a response to the request from the second logical unit.

9. The method of claim 8, wherein
the emulator facilitates execution of computer programs consisting only of legacy program code, and
the second logical unit is executed as a separate application that consists only of legacy program code.

10. The method of claim 8, wherein
the first logical unit checks for a response from the second logical unit.

11. The method of claim 10, further comprising
the first logical unit checking whether the second logical has terminated execution.

12. The method of claim 8, further comprising
the first logical unit generating an error message when the second logical unit does not provide a response.

13. The method of claim 8, further comprising
the first logical unit generating an error message when the second logical unit does not terminate execution.

14. A computer program product comprising a computer-usable storage memory having stored therein computer-usable program code for using a computer program that accesses legacy program code, the computer-usable program code, which when executed by a computer hardware system, causes the computer hardware system to perform
distinguishing between non-legacy program code of the computer program and legacy program code of the computer program;
separating the computer program into at least a first logical unit comprising non-legacy program code and at least a second logical unit comprising legacy program code;
including interface code within the first logical unit that communicates with the second logical unit, wherein the interface code is non-legacy program code; and
outputting the first logical unit and the second logical unit.

15. The computer program product of claim 14, wherein the computer-usable program code further causes the computer hardware system to perform
processing the first logical unit and the second logical to execute in different processes within the computer hardware system.

16. The computer program product of claim 14, wherein the computer hardware system is a non-legacy computing platform, and the computer-usable program code further causes the computer hardware system to perform:
compiling the first logical unit to execute natively within the computing platform; and
compiling the second logical unit to execute as non-native program code within the computing platform in cooperation with an emulator.

17. The computer program product of claim 14, wherein the computer hardware system is a legacy computing platform, and the computer-usable program code further causes the computer hardware system to perform
compiling the first logical unit and the second logical unit to execute natively within the computing platform.

18. The computer program product of claim 17, wherein computer-usable program code further causes the computer hardware system to perform
including within the second logical unit legacy program code that outputs a result of the second logical unit and terminates execution of the second logical unit.

19. The computer program product of claim 14, wherein including the interface code comprises
adding program code within the first logical unit that
initiates execution of the second logical unit,
issues a request to the second logical unit, and
determines whether the second logical unit is executing.

20. The computer program product of claim 14, wherein
the legacy program code executes natively with a first type of processor and
the non-legacy program code executes natively with a second type of processor.

* * * * *